(No Model.)

C. G. SULLIVAN.
TELLURIAN.

No. 531,399. Patented Dec. 25, 1894.

Witnesses,

Inventor,
Cornelius G. Sullivan
By Dewey & Co.
Attys

UNITED STATES PATENT OFFICE.

CORNELIUS G. SULLIVAN, OF WOODLAND, CALIFORNIA.

TELLURIAN.

SPECIFICATION forming part of Letters Patent No. 531,399, dated December 25, 1894.

Application filed April 25, 1894. Serial No. 509,032. (No model.)

*To all whom it may concern:*

Be it known that I, CORNELIUS G. SULLIVAN, a citizen of the United States, residing in Woodland, Yolo county, State of California, have invented an Improvement in Tellurians; and I hereby declare the following to be a full, clear, and exact description of the same.

My invention relates to the general class of tellurians.

It consists in the novel arrangement and connection of the illustrative bodies which I shall hereinafter fully describe and specifically claim.

The object of the invention is to provide a simple and inexpensive instrument for illustrating the movement of the earth and moon about the sun, the movement of the moon about the earth, solar and lunar eclipses, and, finally, to illustrate the cause of the tides in connection with what may be termed the "centrifugal" theory.

Figure 1:
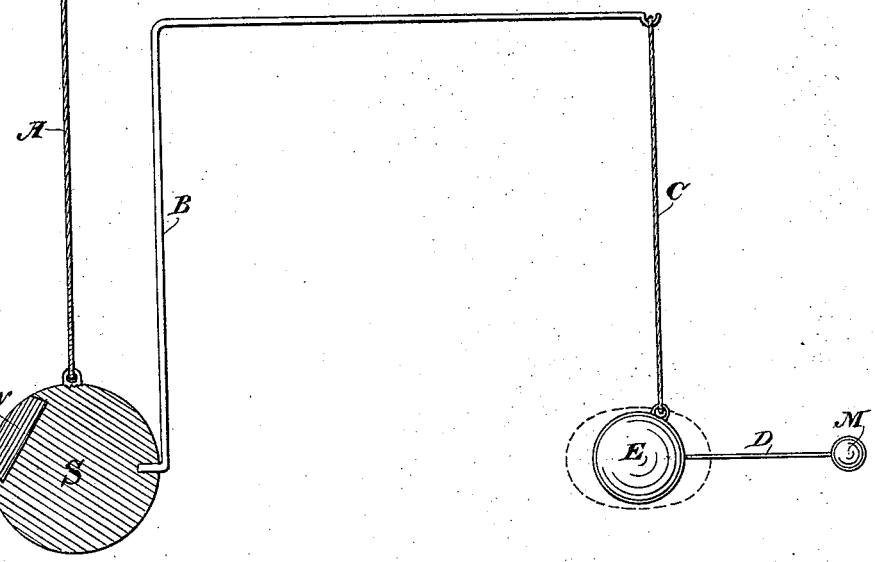
Figure 2:
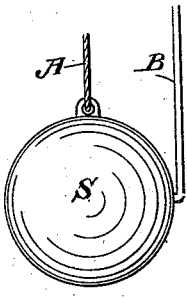
Figure 2:
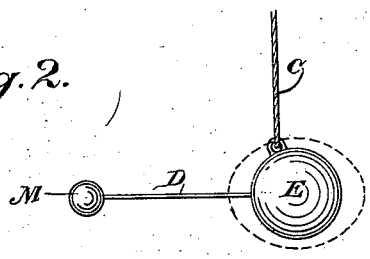

Referring to the accompanying drawings for a more complete explanation of my invention,—Figure 1 is a view of my tellurian, showing the sun and moon in opposition, and illustrating, by the dotted line, the highest water of the spring tide. Fig. 2 is a view showing the sun and moon in conjunction and illustrating the next highest water of the spring tide.

S is a body representing the sun. This is suspended by a line A, adapted to be twisted, and by the torsion of which the body S has imparted to it a rotation in order to cause the revolution about it of the body E, representing the earth, and the body M, representing the moon. Secured to the body S is an arm or bracket B, from the outer end of which is suspended by a line C, the body E. Thus as the body S rotates, the body E is caused to revolve around it. In addition to this movement of the body E, it has, by the torsional force of the line C, after the latter is twisted, a rotary movement whereby the body M, which is secured to it by an arm D, is caused to revolve around said body E. Thus are illustrated the revolution of the earth and moon about the sun, the revolution of the moon about the earth, and the solar and lunar eclipses.

The operator has only to hold or otherwise suspend the device from the line A, having first properly twisted both line A and line C, and the proper motions are imparted by the torsion of said lines. These simple means for giving the movements simplify the instrument and render it possible to economically construct it and supply it to all schools.

The body S is weighted, as shown at W, in order to balance the bodies E and M supported from its other side, and to cause all the bodies to move in substantially the same horizontal plane, to illustrate the solar and lunar eclipses. Now, as illustrating the tides in connection with the "centrifugal" theory, it will be noted that the point of suspension of the earth E is off center, being on that side of the plane of its perpendicular axis nearer the moon. It is obvious, therefore, that, like any eccentric, the points on its surface on the greater side of its center of rotation will travel faster than the points on its smaller side, and at the former points centrifugal force will be greater than at the latter points. This eccentric suspension of the body E is to illustrate that movement of the earth in a circle concentric to movement of the moon, and which is due to their reciprocal attraction. This movement is about a center supposed to be a few miles below the earth's surface, and is, therefore, well illustrated by the eccentric suspension of the body E. Such a movement of the earth being recognized, it follows that centrifugal force is not equal in its effect on the water over its surface, and in my apparatus the effect of this variation is illustrated in Fig. 1 wherein the attraction of the sun, and the greater centrifugal force on the larger side of body E (the moon being full) results in the highest water of the spring tide, while in Fig. 2 is illustrated the next highest water of the spring tide, because though the sun and moon (the latter being new) are combined in their attraction, they are opposed by the greater centrifugal force on the opposite side of the earth.

The cause of the neap tides, which occur when the moon is quartering, can also be illustrated by my apparatus, and the attraction of the sun acting against that of the moon is, at these times, assisted by the greater centrifugal force, in making high water lowest and low water highest.

Having thus described my invention, what I claim as new, and desire to secure by Letters Patent, is—

1. In a tellurian, the combination of a primary body, a suspending line acting by torsion to rotate said body, a secondary body and a connection between said secondary body and the primary body whereby the former is caused to revolve about the latter by the rotation of said primary body substantially as herein described.

2. In a tellurian, the combination of a primary body having a means for rotating it, and provided with an arm or bracket extending from it, a secondary body and a line suspending said secondary body from the arm or bracket of the primary body, whereby said secondary body is caused to revolve about the primary body, said line acting by torsion to impart rotation to said secondary body, substantially as herein described.

3. In a tellurian, the combination of a primary body having a means for rotating it, and provided with an arm or bracket extending from it, a secondary body and a line suspending said secondary body from the arm or bracket of the primary body, whereby said secondary body is caused to revolve about the primary body, said line acting by torsion to impart rotation to said secondary body, and a satellite body connected with the secondary body, revolving around it and accompanying it in its revolution about the primary body, substantially as herein described.

4. A tellurian, comprising a primary body, a suspending line acting by torsion to rotate said body, an arm extending from said body, a secondary body and a line suspending it from the arm of the primary body and acting by torsion to rotate said secondary body, substantially as herein described.

5. A tellurian, comprising a primary body, a suspending line acting by torsion to rotate said body, an arm extending from said body, a secondary body, a line suspending it from the arm of the primary body and acting by torsion to rotate said secondary body, and a satellite body connected with said secondary body, substantially as herein described.

6. A tellurian, comprising the body S suspended by a line adapted to be twisted and having the counterbalancing weight on one side and the arm on the other, the body E suspended from the said arm by a line adapted to be twisted, and the body M connected with body E, substantially as herein described.

7. In a tellurian, the combination with a primary body, of a secondary body and accompanying satellite body, and a connection with the secondary body operating by torsion to cause it and the satellite body to revolve about the primary body, said secondary body being mounted to rotate eccentrically, substantially as herein described.

8. In a tellurian, the combination with the rotatable primary body, of the secondary body and accompanying satellite body, and the line attached eccentrically to said secondary body and suspended from an arm extending from the primary body, said line acting by torsion to rotate said secondary body eccentrically, substantially as herein described.

9. A tellurian comprising the primary body suspended by a line adapted to be twisted, said body having an extending arm, the secondary body E having a line attached eccentrically to it and suspending it from the arm of the primary body, said line acting by torsion to rotate said secondary body eccentrically and the satellite body connected with the body E, substantially as herein described.

In witness whereof I have hereunto set my hand.

C. G. SULLIVAN.

Witnesses:
E. E. GADDIS,
M. O. HARLING.